United States Patent
Camp

[15] 3,656,688
[45] Apr. 18, 1972

[54] AIRCRAFT COMPUTER

[72] Inventor: William J. Camp, 14 B Glendale Manor, Pleasantville, N.J. 08232

[22] Filed: Dec. 29, 1969

[21] Appl. No.: 888,269

[52] U.S. Cl. .................................235/86, 235/61 NV
[51] Int. Cl. ................................................G06c 3/00
[58] Field of Search.............................235/86, 71, 61 NV

[56] References Cited

UNITED STATES PATENTS

| | | | |
|---|---|---|---|
| 909,290 | 1/1909 | Hall | 235/86 |
| 2,030,466 | 2/1936 | Paris | 235/86 X |
| 2,465,238 | 3/1949 | Laux et al. | 235/86 |
| 3,037,285 | 6/1962 | Flowers et al. | 235/86 X |
| 3,037,693 | 6/1962 | Du Pont | 235/61 |
| 3,112,874 | 12/1963 | Greiner | 235/61 |
| 3,193,195 | 7/1965 | Jeffries, Jr. | 235/61 |
| 3,330,478 | 7/1967 | Berry | 235/61 |
| 3,391,864 | 7/1968 | Adler | 235/71 |
| 3,401,879 | 9/1968 | Close | 235/61 |

Primary Examiner—Stephen J. Tomsky
Assistant Examiner—Stanley A. Wal
Attorney—Nelson E. Kimmelman and Maleson, Kimmelman & Ratner

[57] ABSTRACT

A device for instantly computing time, distance and fuel in an aircraft consisting of a housing, a vertically movable tape and a horizontally movable tape. The vertically movable tape indicates time and the horizontally movable tape indicates distance and fuel. The indicia on both tapes work in conjunction with indicia on the face of the housing.

9 Claims, 9 Drawing Figures

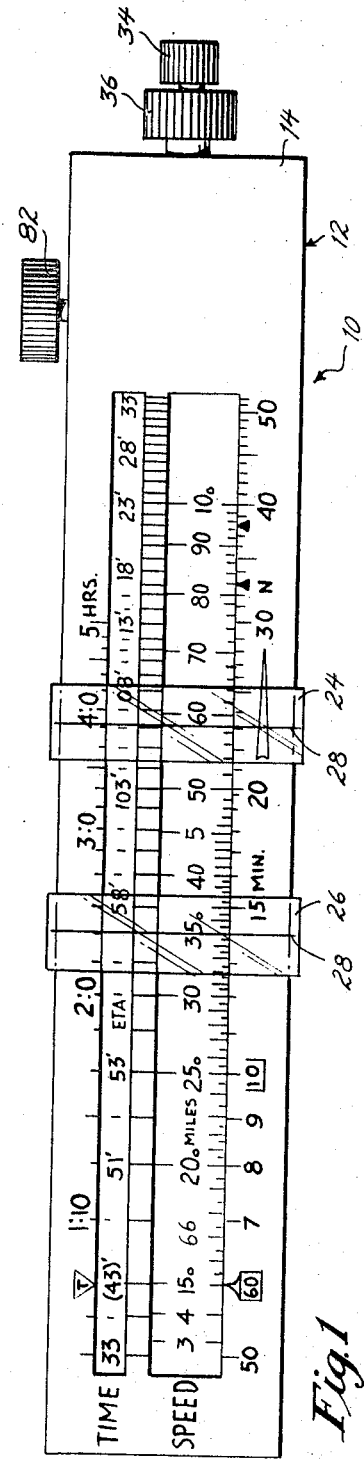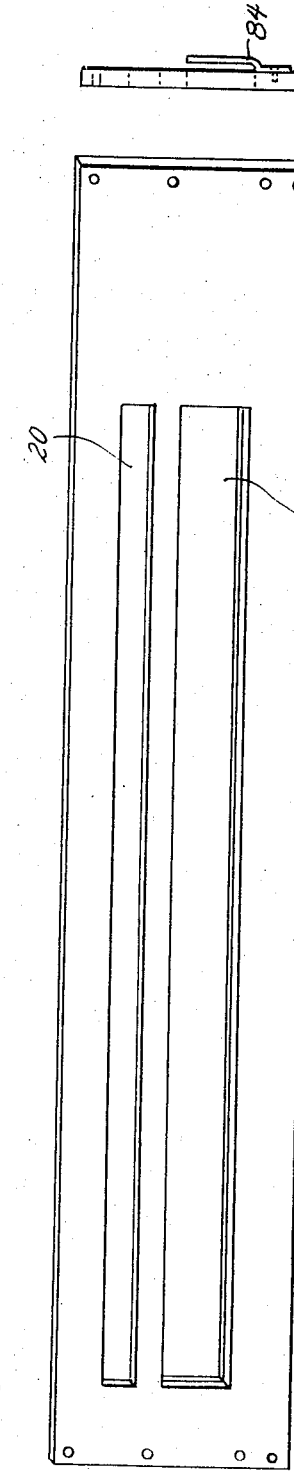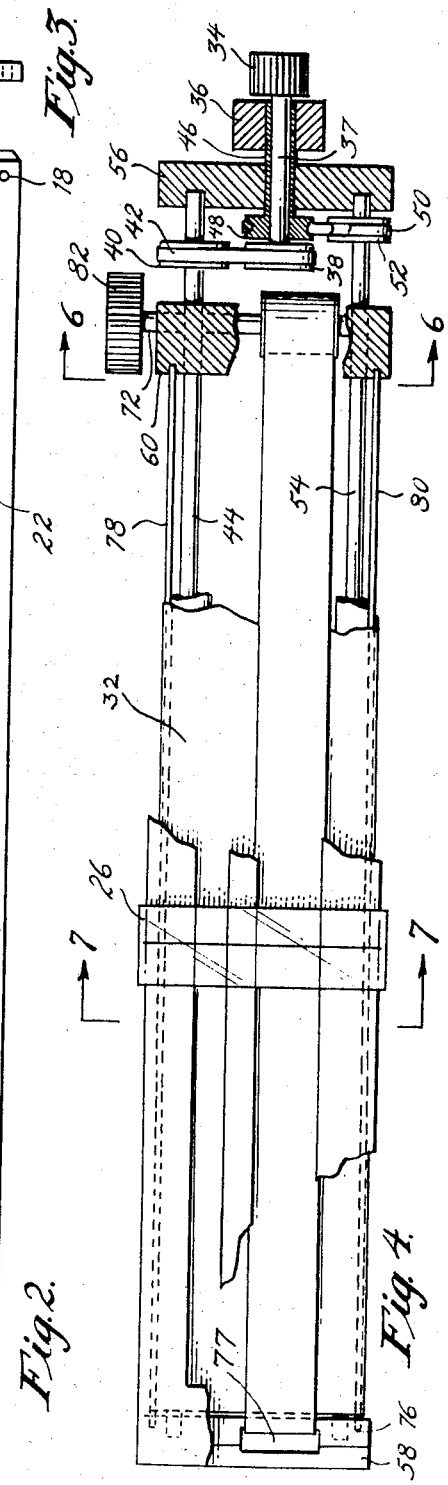

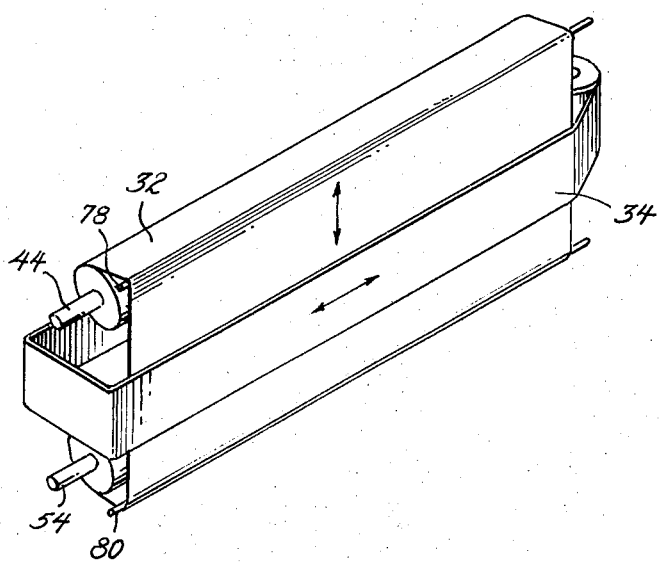
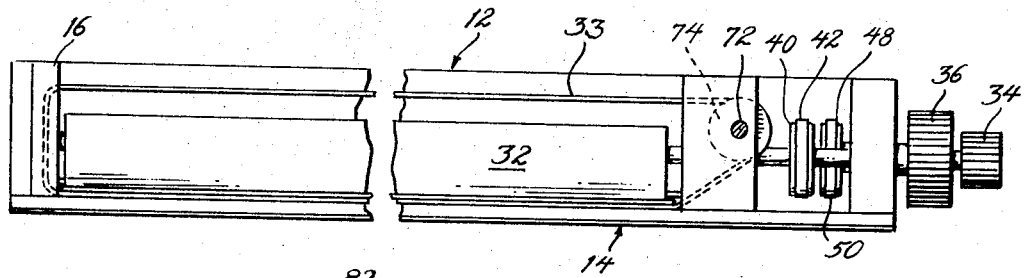
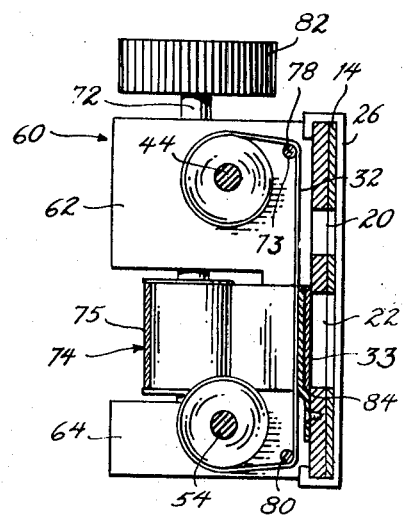
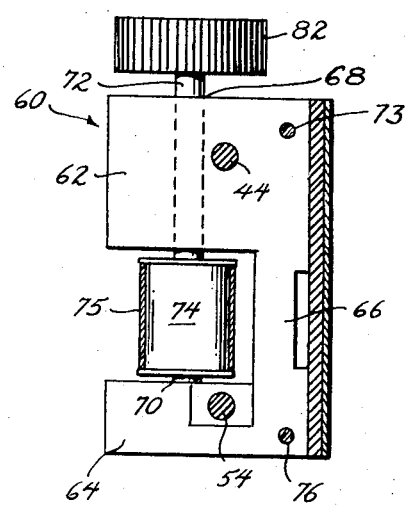
INVENTOR.
WILLIAM J. CAMP, JR.

3,656,688

AIRCRAFT COMPUTER

BACKGROUND OF THE INVENTION

1. FIELD OF THE INVENTION

The present invention relates to an aircraft computer and more particularly to an aircraft computer having means to instantly compute time, distance and fuel.

2. PRIOR ART

One of the most important duties of an aircraft pilot is to estimate his arrival time at each fixed point along his fixed airway route. This time is, of course, variable according to air speed, wind currents and other factors.

In the past, the pilot in computing his estimated arrival time at any fixed point, would first establish the distance to be flown between his present position and the fixed point. He would then estimate his air speed and determine the actual flying time necessary to complete the trip. Then by adding this time to the actual time of the day, he could estimate approximately what his arrival time would be. This procedure is naturally cumbersome and time consuming especially when required during the actual flight. It was also necessary to repeat this entire procedure when his new arrival time is requested by ground control at any time during his flight.

There is on the market today, a device, similar to a circular slide rule, which allows the pilot to constantly compute the flying time between fixed points along his flight route still necessitates the utilization of the pilot's watch and the procedure of computation must be repeated in its entirety at each request during flight. The only advantage of this device would be that the pilot does not have to use a pencil in converting the air speed and total miles into a real travelling time. But, as aforementioned, the pilot would still have to add the actual travelling time to the time of day to arrive at the estimated arrival time at each and every fixed point.

The instant invention provides a device which will compute the estimated arrival time without the need of relying on the pilot's watch after the initial setting at the time of take off and will allow additional corrections along the route.

It is therefore an object of the present invention to provide a device for computing the estimated arrival time of an aircraft travelling along its fixed airway route.

Another object is the provision of device which will instantly compute the estimated arrival time, distance in miles and fuel content at any time along the airway route.

A further object is to provide an aircraft computer for computing estimated arrival time of an aircraft without relying on the pilot's watch, after the initial setting is noted, at time of takeoff.

An additional object is the provision of an aircraft computer which can be either fixed in the aircraft or carried by the pilot and removably secured in the aircraft.

Still another object is to provide an aircraft computer which is inexpensive to produce and requires little or no maintenance.

BRIEF SUMMARY OF THE INVENTION

The invention includes a housing having two viewing windows therein. A horizontally movable belt containing speed indicia thereon is visible behind the lower window and a vertically movable belt containing time indicia thereon is visible behind the upper window. A pair of slides each having a hair line thereon is movably attached to the outside of the housing to provide means to obtain a reading and retain said reading until physically moved by the pilot. The two belts are movably controlled by a pair of knobs located outside the housing for easy operation by the pilot.

The above objects as well as others together with the benefits and advantages of the invention will be apparent upon reference to the detail description set forth below, particularly when taken in conjunction with the drawings annexed hereto.

BRIEF DESCRIPTION OF THE DRAWINGS

FIG. 1 Shows a front elevation of a preferred embodiment of the invention.

FIG. 2 Shows an isometric view of the back of the face plate of the apparatis as shown in FIG. 1.

FIG. 3 Shows an end view of the face plate.

FIG. 4 Shows a fragmentary front elevation with parts broken away.

FIG. 5 Shows a plan view with some parts omitted.

FIG. 6 is a section taken along the lines 6—6 of FIG. 4.

FIG. 7 is a section taken along the lines 7-7 of FIG. 4.

FIG. 8 is an isometric interior view of both tapes in position.

DETAILED DESCRIPTION OF THE DRAWINGS

Figure 9:
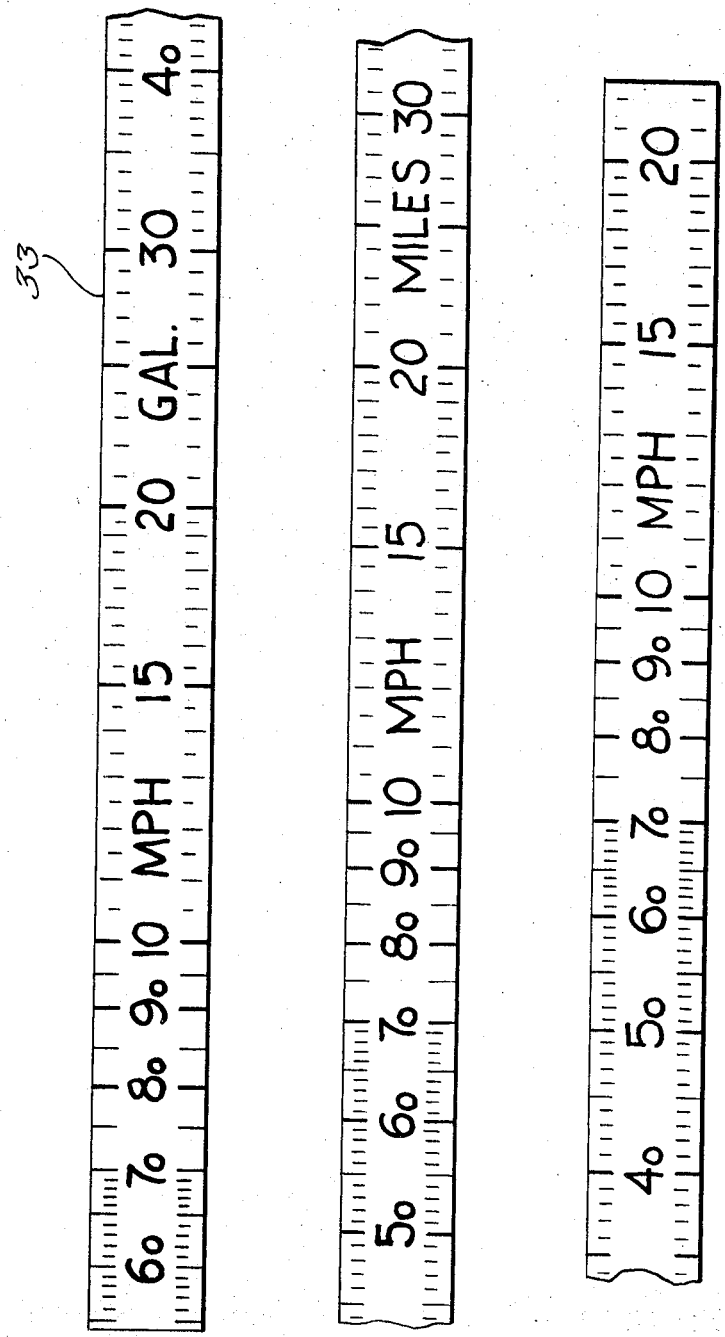
FIG. 9 illustrates the indicia on the ground speed tape.

Referring now to the drawings, wherein the same reference characters designate the same parts throughout the several views, there is shown in FIG. 1 an aircraft computer 10 having a housing 12 comprised of a face plate 14 and a back portion 16. The face plate 14 fits on the front of the back portion as shown in FIGS. 2 and 5 and is removably secured thereto by the use of screws (not shown) which screw into the openings 18. The face plate 14 is also provided with windows 20 and 22 which allow visual access to the movable webs or tapes of the computer. A pair of slides 24 and 26 are movably secured to face plate 14 and each has a hair line 28 running vertically through the mid portion of the slide for reasons to be explained infra. Indicia is etched or otherwise formed on the face plate 14 to indicate time and will be explained infra.

Referring now to FIGS. 4–8 a time tape 32 is shown in position inside of the ground speed tape 4. The time tape 32 is a plastic vinyl, for example, cloth having indicia printed thereon. The indicia is set forth in the following chart:

| | | | | | | | | | |
|---|---|---|---|---|---|---|---|---|---|
| 48 | 49 | 06 | 08 | 13 | 18 | 23 | 28 | 38 | 48 |
| 49 | 59 | 07 | 09 | 14 | 19 | 24 | 29 | 39 | 49 |
| 50 | 00 | 08 | 10 | 15 | 20 | 25 | 30 | 40 | 50 |
| 51 | 01 | 09 | 11 | 16 | 21 | 26 | 31 | 41 | 51 |
| 52 | 02 | 10 | 12 | 17 | 22 | 27 | 32 | 42 | 52 |
| 53 | 03 | 11 | 13 | 18 | 23 | 28 | 33 | 43 | 53 |
| 54 | 04 | 12 | 14 | 19 | 24 | 29 | 34 | 44 | 54 |
| 55 | 05 | 13 | 15 | 20 | 25 | 30 | 35 | 45 | 55 |
| 56 | 06 | 14 | 16 | 21 | 26 | 31 | 36 | 46 | 56 |
| 57 | 07 | 15 | 17 | 22 | 27 | 32 | 37 | 47 | 57 |
| 58 | 08 | 16 | 18 | 23 | 28 | 33 | 38 | 48 | 58 |
| 59 | 09 | 17 | 19 | 24 | 29 | 34 | 39 | 49 | 59 |
| 00 | 10 | 18 | 20 | 25 | 30 | 35 | 40 | 50 | 00 |
| 01 | 11 | 19 | 21 | 26 | 31 | 36 | 41 | 51 | 01 |
| 02 | 12 | 20 | 22 | 27 | 32 | 37 | 42 | 52 | 02 |
| 03 | 13 | 21 | 23 | 28 | 33 | 38 | 43 | 53 | 03 |
| 04 | 14 | 22 | 24 | 29 | 34 | 39 | 44 | 54 | 04 |
| 05 | 15 | 23 | 25 | 30 | 35 | 40 | 45 | 55 | 05 |
| 06 | 16 | 24 | 26 | 31 | 36 | 41 | 46 | 56 | 06 |
| 07 | 17 | 25 | 27 | 32 | 37 | 42 | 47 | 57 | 07 |
| 08 | 18 | 26 | 28 | 33 | 38 | 43 | 48 | 58 | 08 |
| 09 | 19 | 27 | 29 | 34 | 39 | 44 | 49 | 59 | 09 |
| 10 | 20 | 28 | 30 | 35 | 40 | 45 | 50 | 00 | 10 |
| 11 | 21 | 29 | 31 | 36 | 41 | 46 | 51 | 01 | 11 |
| 12 | 22 | 30 | 32 | 37 | 42 | 47 | 52 | 02 | 12 |
| 13 | 23 | 31 | 33 | 38 | 43 | 48 | 53 | 03 | 13 |
| 14 | 24 | 32 | 34 | 39 | 44 | 49 | 54 | 04 | 14 |
| 15 | 25 | 33 | 35 | 40 | 45 | 50 | 55 | 05 | 15 |
| 16 | 26 | 34 | 36 | 41 | 46 | 51 | 56 | 06 | 16 |
| 17 | 27 | 35 | 37 | 42 | 47 | 52 | 57 | 07 | 17 |
| 18 | 28 | 36 | 38 | 43 | 48 | 53 | 58 | 08 | 18 |
| 19 | 29 | 37 | 39 | 44 | 49 | 54 | 59 | 09 | 19 |
| 20 | 30 | 38 | 40 | 45 | 50 | 55 | 00 | 10 | 20 |
| 21 | 31 | 39 | 41 | 46 | 51 | 56 | 01 | 11 | 21 |
| 22 | 32 | 40 | 42 | 47 | 52 | 57 | 02 | 12 | 22 |
| 23 | 33 | 41 | 43 | 48 | 53 | 58 | 03 | 13 | 23 |
| 24 | 34 | 42 | 44 | 49 | 54 | 59 | 04 | 14 | 24 |
| 25 | 35 | 43 | 45 | 50 | 55 | 00 | 05 | 15 | 25 |
| 26 | 36 | 44 | 46 | 51 | 56 | 01 | 06 | 16 | 26 |
| 27 | 37 | 45 | 47 | 52 | 57 | 02 | 07 | 17 | 27 |
| 28 | 38 | 46 | 48 | 53 | 58 | 03 | 08 | 18 | 28 |
| 29 | 39 | 47 | 49 | 54 | 59 | 04 | 09 | 19 | 29 |
| 30 | 40 | 48 | 50 | 55 | 00 | 05 | 10 | 20 | 30 |
| 31 | 41 | 49 | 51 | 56 | 01 | 06 | 11 | 21 | 31 |
| 32 | 42 | 50 | 52 | 57 | 02 | 07 | 12 | 22 | 32 |
| 33 | 43 | 51 | 53 | 58 | 03 | 08 | 13 | 23 | 33 |
| 34 | 44 | 52 | 54 | 59 | 04 | 09 | 14 | 24 | 34 |
| 35 | 45 | 53 | 55 | 00 | 05 | 10 | 15 | 25 | 35 |
| 36 | 46 | 54 | 56 | 01 | 06 | 11 | 16 | 26 | 36 |
| 37 | 47 | 55 | 57 | 02 | 07 | 12 | 17 | 27 | 37 |
| 38 | 48 | 56 | 58 | 03 | 08 | 13 | 18 | 28 | 38 |
| 39 | 49 | 57 | 59 | 04 | 09 | 14 | 19 | 29 | 39 |
| 40 | 50 | 58 | 00 | 05 | 10 | 15 | 20 | 30 | 40 |
| 41 | 51 | 59 | 01 | 06 | 11 | 16 | 21 | 31 | 41 |
| 42 | 52 | 00 | 02 | 07 | 12 | 17 | 22 | 32 | 42 |

| 43 | 53 | 01 | 03 | 08 | 13 | 18 | 23 | 33 | 43 |
| 44 | 54 | 02 | 04 | 09 | 14 | 19 | 24 | 34 | 44 |
| 45 | 55 | 03 | 05 | 10 | 15 | 20 | 25 | 35 | 45 |
| 46 | 56 | 04 | 06 | 11 | 16 | 21 | 26 | 36 | 46 |
| 47 | 57 | 05 | 07 | 12 | 17 | 22 | 27 |    | 37 | 47 |

This tape 32 is arranged to move up or down by appropriate manipulation of knob 34 or 36, depending on the direction desired. Knob 34, by way of shaft 37 controls wheel 38 which is connected to wheel 40 by belt 42. Wheel 40 is secured to roller 44 to which the top end of the tape 32 is attached. Accordingly, when attempting to move the tape 32 in an upward direction the knob 34 is utilized. When necessary to wind in the opposite direction or downward, knob 36 is utilized. Knob 36, through shaft 46, controls wheel 48 which is connected by way of belt 50, to wheel 52. Wheel 52 is secured to roller 54 to which the bottom of tape 32 is affixed. Rollers 44 and 54 are journalled in appropriate apertures in end members 56 and 58. Shafts 37 and 46 are coaxial and pass through end member 56 as seen in FIG. 4.

The ground speed tape 33 (See FIG. 9) is an endless vinyl cloth having indicia printed thereon. Tape 33 is secured around end member 58 and member 60. Member 60 is constructed as seen in FIGS. 7 and 8 having wing 62 connected to wing 64 by bridge 66. Wings 62 and 64 have respective openings 68 and 70 therethrough for acceptance of each end of drive rod 72. Wings 62 and 64 are also provided with respective openings 73 and 76 for acceptance of rods 78 and 80, respectively for holding member 60 in position with respect to member 58 and for supporting the time tape 32 as seen in FIG. 4. The drive rod 72 has a drum 74 secured thereto. A live rubber sleeve 75 covers drum 74 for better tape traction. The tape 34 is movably secured between drum 74 and a slot 77 on member 58, and controlled in horizontal movement in either direction by knob 82. The tape 34 appears in the window 22 and is guided in back of the window 22 between a ledge 84 and the back of face plate 14. (See FIG. 3.)

In operation, the pilot sets the time tape for any given minute in time by moving same until the minute is located at the time index T on the face plate.

The example in FIG. 1 shows the time tape set to 43 minutes after the hour, appearing under the time index or T. Any time may be set by the pilot from 00 through 59 minutes in real time.

The time tape is a 60 minute tape which is set on takeoff, over a fix point or at any given minute in time by the pilot. Once set it becomes a record of the event, such as the take-off time or time over a fix point in navigation.

Once the time tape is set the arrival time or estimated time of arrival over any other fix or the ETA along the route may be determined by reading the time tape directly above the given fix point or miles out from the mile scale by use of the first slide 24.

FIG. 1 shows by way of example, the operation of the computer wherein an aircraft leaving a fixed point along its travel route at 43 minutes past the hour, (read under the Time Index T) should arrive at a fixed point (see hairline on slide 26 on the Time Tape) 35 miles therefrom at 57 minutes past the hour (see hairline on slide 26 on the speed tape) or 14 minutes later. The aircraft travelling at approximately 150 MPH is set on the speed tape under the speed index or 60 point. The second fix point, in this example being set at 59 miles out, (see hairline on slide 24 on speed tape) and accordingly at the same speed, i.e. 150 MPH, should be reached in 6 minutes past the hour or 9 minutes later (see hairline on slide 24 on speed tape).

The ground speed tape can also be used for gallons of fuel or can be used as nautical miles rather than ground miles. Thus, the numerals 15, 20, 25 on the speed tape can represent fuel consumption. As shown in FIG. 1, then, the numeral "15" over the index "60" could represent 15 gallons per hour.

The housing can be made of a molded plastic or metal.

Obviously many modifications and variations of the present invention are possible in light of the above teachings. It is therefore to be understood, that within the scope of the appended claims, the invention may be practiced otherwise than as specifically described.

I claim:

1. A computing apparatus comprising
   a. a housing have a plurality of viewing regions formed therein,
   b. a first movable belt with first ordered quantative indicia thereon adapted to be moved in a first direction and partially visible through a first of said viewing regions,
   c. a second movable belt with second ordered quantative indicia thereupon adapted to be moved in a second direction substantially transverse to said first direction and being partially visible through a second of said viewing regions,
   d. a plurality of displaceable indicators movable in proximity to said belts for relating indicia on one of said belts with indicia on the other of said belts.

2. The apparatus according to claim 1 wherein at least one of said indicia is navigational indicia.

3. The apparatus according to claim 2 wherein said first belt includes indicia related to time and wherein said second belt includes indicia related to velocity.

4. The apparatus according to claim 3 wherein said second belt also includes indicia related to fuel consumption.

5. The apparatus according to claim 2 wherein one of said belts passes in front of the other.

6. The apparatus according to claim 2 wherein a face of said housing has indicia thereon next to each of said viewing regions, said indicia respectively relating to the indicia of the two belts appearing in the two viewing regions, said viewing regions both being horizontally disposed.

7. The apparatus according to claim 2 including means to move said first movable belt including
   a. a pair of parallel rods for securing thereto each end of said movable belt,
   b. an end member secured to each end of said rods,
   c. a first shaft journaled through one of said end members,
   d. a second shaft journaled through said first shaft,
   e. a first knob secured on one end of the first shaft,
   f. a second knob secured on one end of the second shaft,
   g. a first wheel secured on the other end of said first shaft,
   h. a second wheel secured on the other end of said second shaft,
   i. a third wheel secured on one of said parallel rods adjacent to said first wheel,
   j. a forth wheel secured on the other of said parallel rods adjacent to said second wheel, and
   k. belt means between said first and third wheels and between said second and fourth wheels.

8. The apparatus according to claim 2 including means to move said second movable belt including
   a. a pair of parallel rods,
   b. an end member secured to each end of said rods,
   c. a drive rod movably secured in one of said end members,
   d. a drum secured to said drive rod,
   e. notch means provided in said other end member adjacent said drum, and
   f. a knob attached to one end of said drive rod to move said belt between said drum and said notch means.

9. The apparatus according to claim 1 wherein said first belt is manually movable in a horizontal direction and said second belt is manually movable in a vertical direction.

* * * * *